United States Patent [19]
Horttonen

[11] Patent Number: 5,197,568
[45] Date of Patent: Mar. 30, 1993

[54] ASSEMBLING SERIES OF DISTRIBUTION AND MEASURING UNITS FOR A LUBRICATING OIL SYSTEM AND FOR MANUFACTURING THE PRINCIPAL COMPONENTS OF THE SERIES

[76] Inventor: Kalevi V. Horttonen, Vuorenjuuri 5, SF-40950 Muurame, Finland

[21] Appl. No.: 623,760
[22] PCT Filed: Jun. 15, 1989
[86] PCT No.: PCT/FI89/00116
    § 371 Date: Dec. 12, 1990
    § 102(e) Date: Dec. 12, 1990
[87] PCT Pub. No.: WO89/12779
    PCT Pub. Date: Dec. 28, 1989

[30] Foreign Application Priority Data
Jun. 16, 1988 [FI] Finland .................. 882870

[51] Int. Cl.$^5$ ............................ F16N 27/00
[52] U.S. Cl. .................. 184/7.4; 137/561 A; 285/137.1
[58] Field of Search .......... 184/7.4, 7.3, 7.2, 8; 137/561 A; 72/254; 285/150, 137.1

[56] References Cited

U.S. PATENT DOCUMENTS

| | | | |
|---|---|---|---|
| 3,051,263 | 8/1962 | McKenzie | 184/7.4 |
| 3,175,578 | 3/1965 | Patterson et al. | 137/561 A |
| 4,080,983 | 3/1978 | Stumpmeier | 137/561 A |
| 4,312,425 | 1/1982 | Snow et al. | 184/7.4 |
| 4,663,812 | 5/1987 | Clausen | 72/254 |
| 4,712,578 | 12/1987 | White | 137/561 A |

FOREIGN PATENT DOCUMENTS

2911274 9/1980 Fed. Rep. of Germany ...... 285/150

Primary Examiner—Ira S. Lazarus
Assistant Examiner—Alan B. Cariaso
Attorney, Agent, or Firm—Brooks & Kushman

[57] ABSTRACT

An assembling series of distribution and measurement units for a lubricating oil system for machinery having several bearings includes at least one distribution beam (1-3) equipped with a longitudinal channel and input connections (11,16). Each beam (1-3) includes two or more output connections (9) placed at right-angles to the channel for communication with flowmeters (22) and other components. The series achieves lubricating oil distribution and provides measurement units for various applications. The series reduces in-situ pipe and construction work and replaces it with standardized installation work. The series in accordance with the invention includes at least two differently-sized distribution beams (1-3) and at least two differently-sized feed beams (5-8) to feed several distribution beams (1-3). The differently-sized distribution beams (1-3) are equipped with a varying number of output connections (9), which are each formed of a surface equipped with a ring gasket, against which the gasket surface of the component to be attached is compressed, and the series includes a so-called blind plate (4) or other standard plug to close surplus output connections (9).

4 Claims, 5 Drawing Sheets

ASSEMBLING SERIES OF DISTRIBUTION AND MEASURING UNITS FOR A LUBRICATING OIL SYSTEM AND FOR MANUFACTURING THE PRINCIPAL COMPONENTS OF THE SERIES

TECHNICAL FIELD

This inventions relates to a series of distribution and measuring components for a lubricating oil system for machinery including several bearings and a method of manufacturing the principal components of the series. The series is particularly intended for the construction of the distribution and measuring section of the lubricating oil system of oil-lubricated bearing in a paper machine, but it may also be adapted for use in other applications requiring rapid installation and adaptability.

BACKGROUND ART

Paper machine lubricating oil distribution systems and their problems are described in the Finnish publication print 65661 and the related opposition documents. It is usual for there to be about 300 lubricated bearings in an older paper machine. In newer machines, there may be 600-700 such bearings. Besides lubricating the bearings, the oil cools them, making it important that the correct amount of oil goes to each bearing, and also making it necessary to monitor the oil flow to each bearing separately. For monitoring purposes, the oil is distributed to the bearings by means of a centralized system through a distribution and measuring unit consisting of 5-20 meters. Typical types of meters are visually read rotameters and volumetric flowmeters. The latter include elliptical wheel, turbine, and jet meters, which provide a commensurate indication of the flow.

In the above-mentioned publication, the installation of several volumetric meters in the same unit is shown to have a branch pipe belonging to a common unit. The measurements from the meters are transmitted as electrical impulses to a place that is advantageous from the point of view of control.

The known meter units are inflexible because all are of the same kind. However, many paper machines manufacturers and users would like some of the meters to be flowmeters and some volumetric meters. It is also difficult to change the meters later. However, it is only after a paper machine has been operated for some time that the correct specifications for a meter can be ascertained. There may also be various reasons to change the meters in a paper machine that is already in operation. In known systems, it is not possible to install meters or other components during operation, instead one must wait for the next maintenance shutdown.

Despite meters being collected in units of the present type, complicated pipework is nevertheless required during installation. The directions of the input and output pipes of the unit are always determined beforehand so that in variable cases the pipes must be turned according to each case. Because of its thickness, the incoming feed pipe cannot be bent, which means that pipe bands must be welded onto it.

SUMMARY OF THE INVENTION

An object of the present invention is to provide an assembling series of distribution and measuring unit for a lubricating oil system and a method for manufacturing the principal components of the series to reduce in-situ individual pipe and construction work associated therewith, and to replace it with the installation of standardized components.

Another object of the present invention is to provide a series of distribution and measuring unit for a lubricating oil system and a method for manufacturing the principal components of the series to make possible later installation and alteration work, even with the machine running.

In carrying out the above objects and other objects of the invention, the assembling series of distribution and measurement units for a lubricating oil system is used in machinery having several bearings. The series includes at least one distribution beam having a longitudinal channel and input connections. The distribution beam also has two or more output connections located at right angles to the channel for communication with flowmeters or other components. The series provides a lubricating oil distribution and measurement unit.

The series includes at least two distribution beams of different sizes and at least two feed beams of different sizes to feed the distribution beams. A feed beam is assembled in a transverse direction in relation to a distribution beam. The variously-sized distribution beams are equipped with a plurality of output connections, each defined by an opening. Each opening is surrounded by a ring gasket which is compressed against a gasket surface of the component to be connected to the distribution beam.

According to the invention, a unit of any size is assembled from a few standard parts of the series by combining them in different ways. In addition, by means of combination it is possible to select the directions of the feed pipes and those leaving the meters, in which case pipe bending is considerably reduced when compared with previous methods. The invention presupposes that every meter installed in a unit is equipped with a standard joint or uses a correspondingly adapted component. This only signifies the standardization of the junction surface and screw attachment or similar, as according to the invention, the distribution beams include ready gaskets. In all other ways, any kind of component can be attached to the distribution beams, even while the machine is running.

The invention also makes it possible to prefabricate the supporting structures and various cover plates, because the routes of the incoming and outgoing pipes and the distribution intervals of the beams are known accurately. It is essential that such features, especially the gasket structure, which would be difficult or even impossible to make at the point of installation, are standardized in the standard components in the series. The gasket construction in accordance with the invention makes the system of attaching all kinds of meters and other components extremely simple.

The spacing between output connections makes it always possible to lead the output pipes from the meters connected to them straight back without the output pipes coming into conflict with the feed beam connected to the input connection, which now remains between them.

The principal components of the series are formed of a generally square profile having a central passageway which forms an oil channel and an end hole equipped with an input connection plug or feed pipe connector. The gasket construction demands the prefabrication of the output connections, but the input connection can, on the contrary, be formed during installation by drilling a suitable hole in the flat surface between the distribution intervals. This does not require any special precision.

The series can also include a standard valve or a valve adaption in which the spindle and flow crosssection of the valve body is varied and in which the valve body is placed in a standard diameter component through drilling and extends to the output connection hole. The body and its adaption to different components is always the same, but the spindle and flow crosssectional area vary as required. The standard body section can be most advantageously manufactured by casting, in which case machining is very little.

A method of manufacturing the principal components of the series comprises extruding a blank into a generally square section tube, inside of which is a channel. The formed blank is cut to a predetermined length and input and output connection attachment holes are machined into the formed blank. The manufacture of the preliminary blank by means of extrusion saves an immense amount of machining, because the surfaces of the seal and the internal oil channel are formed at this stage.

In what follows the invention is described with the aid of the accompanying drawing, which show a series in accordance with the invention and distribution and measuring units assembled from components of the series.

BEST MODE FOR CARRYING OUT THE INVENTION

Figure 1:
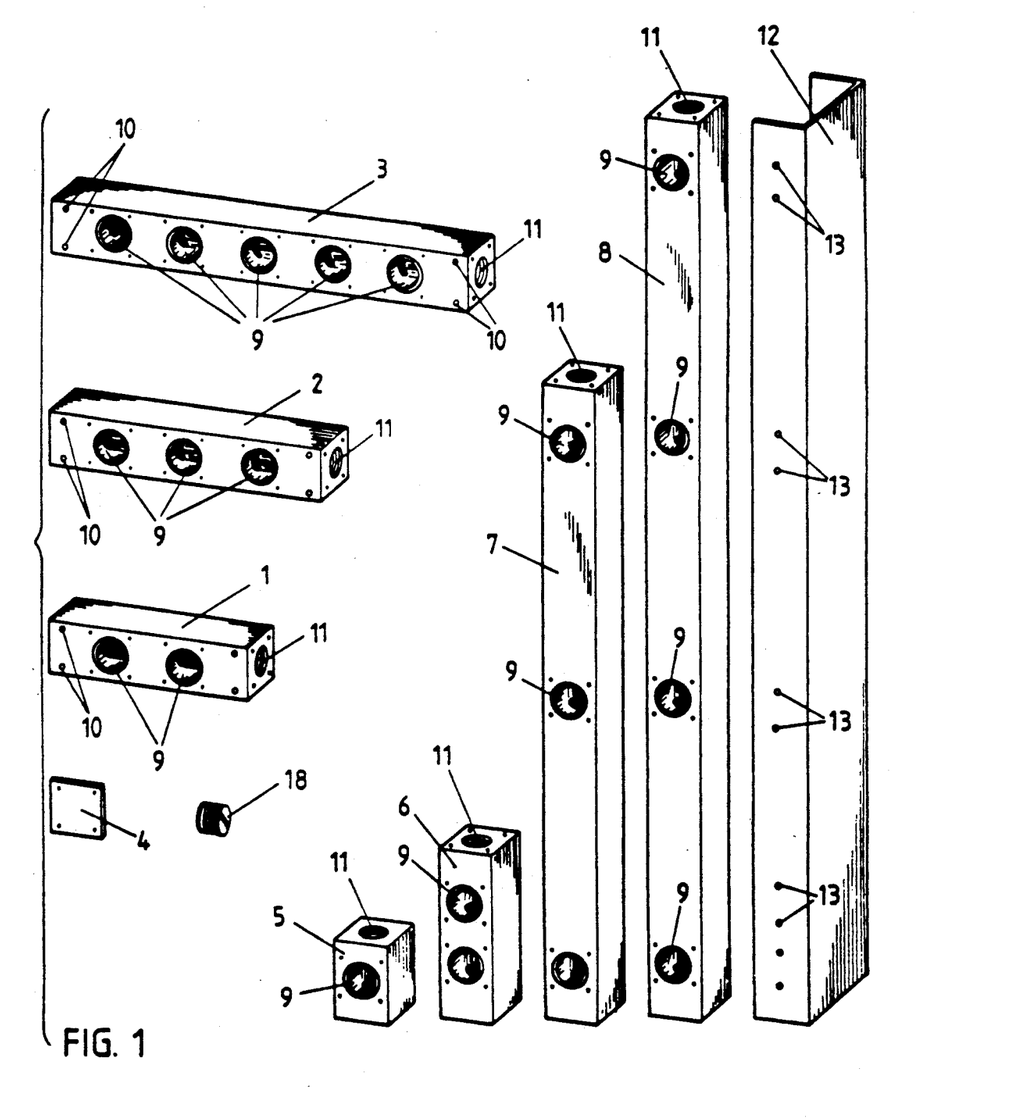
FIG. 1 is an exploded perspective view of assembling series of distribution and measurement unit constructed in accordance with the present invention illustrating the basic components of the series.

Referring to Figure of the drawings, an assembling series of distribution and measurement unit constructed in accordance with the present invention is used in machinery having a lubricating oil system.

The principal components of the series are three distribution beams 1-3 and four feed beams 5-8. A blind plate 4, the standard plug, and support beam 12 are also important components. All the beams 1-3 and 5-8 are manufactured from extruded square aluminum profile, the passageway or hole that is left in the center forms an oil channel. Ends 11 of the beams 1-3 and 5-8 are equipped with a standard pipe thread. The required number of distribution beams 1-3 and 5-8 is selected in accordance with how many bearings there are requiring oil distribution and how many other components the unit will include. Generally, only one size of one to four distribution beams and one feed beam to supply them are chosen for each unit.

A meter or other component is attached to a standardized output connection 9 on the distribution beam 1-3. The same connection 9 is used to connect the feed beams 5-8 and the distribution beams 1-3, because the feed beams 5-8 include the same kind of output connection 9. Reserve or otherwise surplus connections 9 are plugged by means of the blind plate 4.

When only one distribution beam 1-3 is used, it can be fed either from behind or from either end 11. The ends 11 of the beams are equipped with a standard pipe thread. In the same way, the feed beams 5-8 can be fed from both the back and the ends 11. All the unused input connections 9 of the beams, among them the end holes 11, are plugged using a standard plug 18, which corresponds to the size of the pipe thread. The feed beam 5, which is equipped with a single output connection 9, can be attached to all the distribution beams 1-3 and also to other feed beams 6-8. The attachment can be made to behind the beam and to its ends 11 and can always be made in four different directions. Because of this, the thick input pipe can be brought into the unit directly or by using only a single pipe bend. The single length distribution beams 1-3 of the distribution unit are attached by their ends to the support beams 12. To permit attachment, the distribution beams 1-3 have screw holes 10 machined in them and beams 12 have threaded holes 13.

Internal standardization is always followed in constructing the components of the series. The output connections 9 always include a ring gasket 14 that surrounds the opening and against which a smooth surface is always placed. Surplus output connections 9 are blocked by using the blind plate 4. The distribution beams 1-3 and all attachment holes 15 and 17 in the ends and in both sides of the beam are equipped with screw threads, whereas both the components attached to them and the feed beams 5-8 are equipped with corresponding through-drilled holes. The input connections 9 and 16 that are at the rear and ends of beams respectively are equipped with standard pipe threads, in which case surplus connections are blocked off with a suitable standard plug 18; the input connections are also always equipped with threaded attachment holes.

Figure 2A:
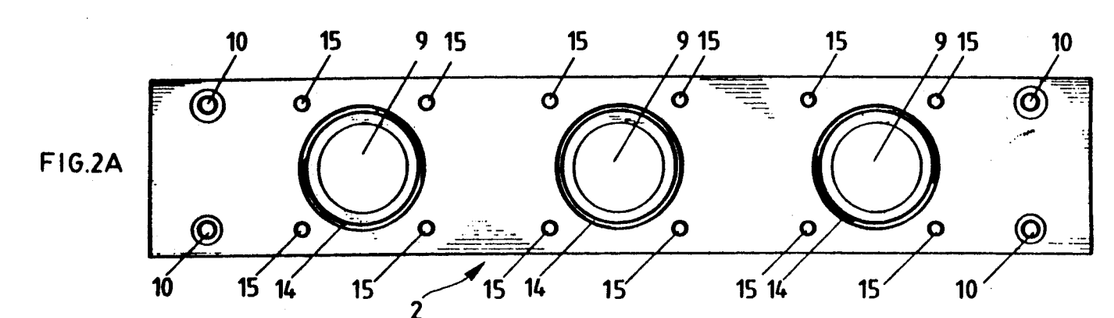
FIGS. 2A, 2B and 2C includes three views of a three-way distribution beam illustrating the front, back and side.
Figures 2B, 2C:
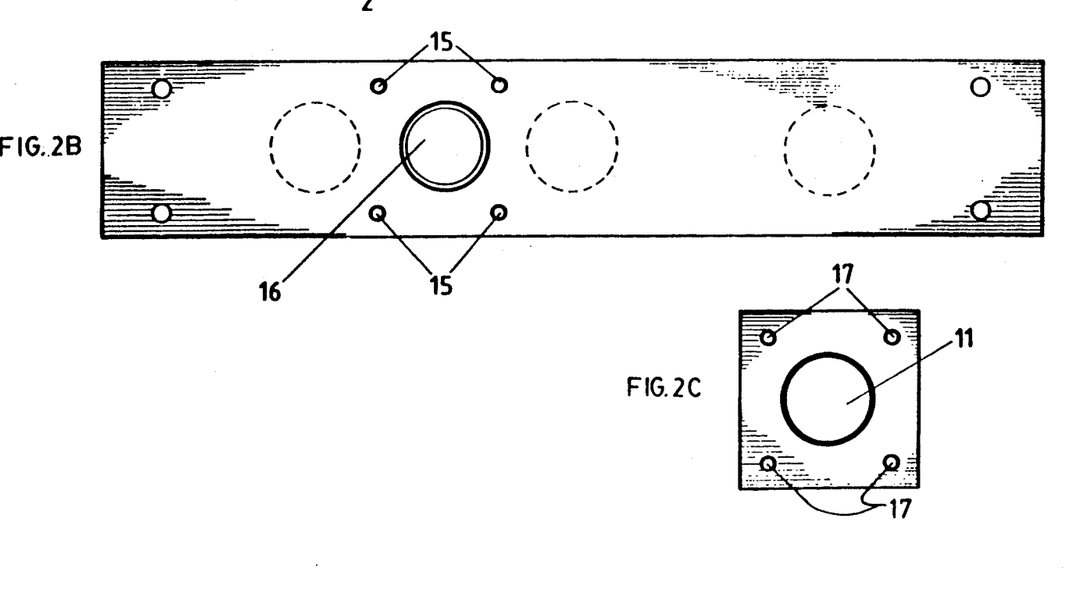

In FIGS. 2A, 2B, and 2C, one distribution beam of the series is shown in detail. Each output connection of the distribution beam 2 includes, in addition to the opening connected to the central channel, a ring gasket 14 placed on the surface, and symmetrically placed attachment holes 15, which are equipped with threads. A groove for the gasket 14 is milled in the surface of the beam. The ends of the distribution beam 2 have through-drilled holes through which the beam can be attached to a support beam 18. The ends and rear of beam 2 are equipped with exactly similar input connections 11 and 16. The connection at the ends is made by providing end hole 11 with a standard pipe thread. Behind the beam, hole 16 has also had to be drilled. In addition, both holes have machined threaded holes 15 and 17.

Figure 3A:
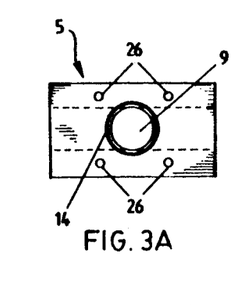
FIGS. 3A and 3B includes two views of a one-way feed beam illustrating the front and side.
Figure 3B:
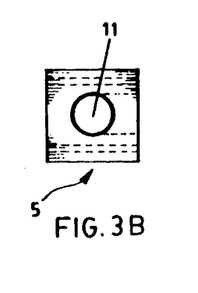

In FIGS. 3A and 3B, the feed beam 5, which is equipped with a single output connection 5, multiplies the possibilities of selecting the direction of an incoming feed pipe. Feed beam 5 forms a multi-purpose connector, which can be connected to each support beam and the rear and ends of other feed beams 6-8. In each distribution unit, the feed beam 5 can be, in principle, located at three places and at each place in four directions. The output connection 9 of feed beam 5 is different to those in distribution beams 1-3 in that in it the through-drilled holes 26 for screws are without threads. Feed beams 5 and 6 with one and two output connections 9 have no input connections at the rear, on account of lack of space. In the others, the input connection at the rear is the same as that in the distribution beams, but it is placed with its attachment hole in a completely different place with respect to output connections 9.

Figure 4A:
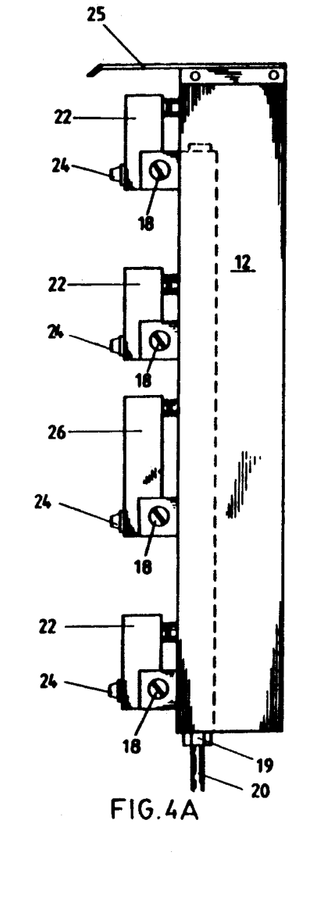
FIGS. 4A, 4B and 4C includes three views of a lubricating oil distribution and measuring unit illustrating the front, side, and top.
Figure 4B:
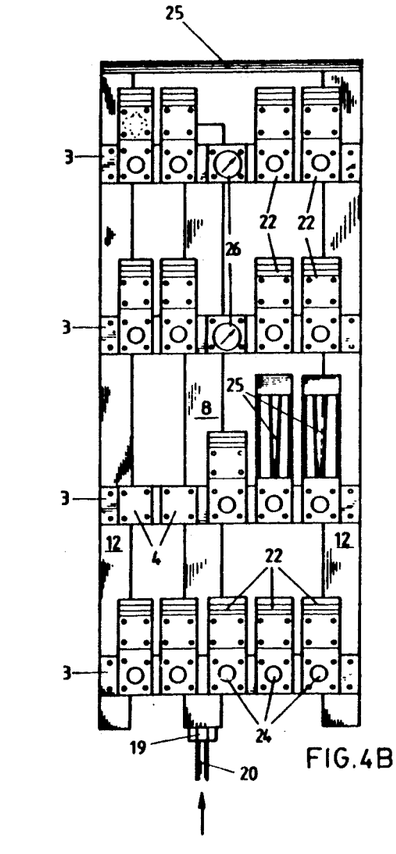
Figure 4C:
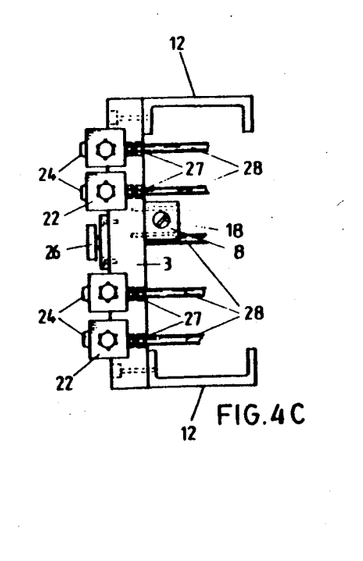

FIGS. 4A, 4B, and 4C show the construction of one kind of distribution and measurement unit. The unit is shown without cover plates 25, in overhead projection. Four five-way distribution beams 3 can have a total of twenty components connected to it. In this example, only two of the outputs 9 have components mounted therein, a pressure meter and thermometer 26, and two of the outputs are in reserve, being covered with blind plates 4. The remaining sixteen outputs 9 are used for the distribution of lubricating oil through flowmeters 22 and 25, which may be any type of flowmeter.

The distribution beams 3 are attached by their 1 ends to the support beams 12, which are secured to the frame of the paper machine. The support beams can also be so-called L-beams, in which attachment holes have been machined at a suitable distance for the distribution beams to be attached to them by their ends.

In this case, the input pipe 20 comes from directly beneath so that it is connected by means of an ordinary pipe connector 19 directly to the end of the feed beam 9. All the other input connections in both the feed beam 9 and the support beams 9 are equipped with standard plug 18.

On account of the staggering of the input connection of distribution beam 3 the pipes 28 coming from the meters 22 bypass feed beam 9. The outgoing pipes 28 are connected to the meters by means of pipe connectors 27. Of the outgoing pipes 28, only a short section is shown.

Figure 5:
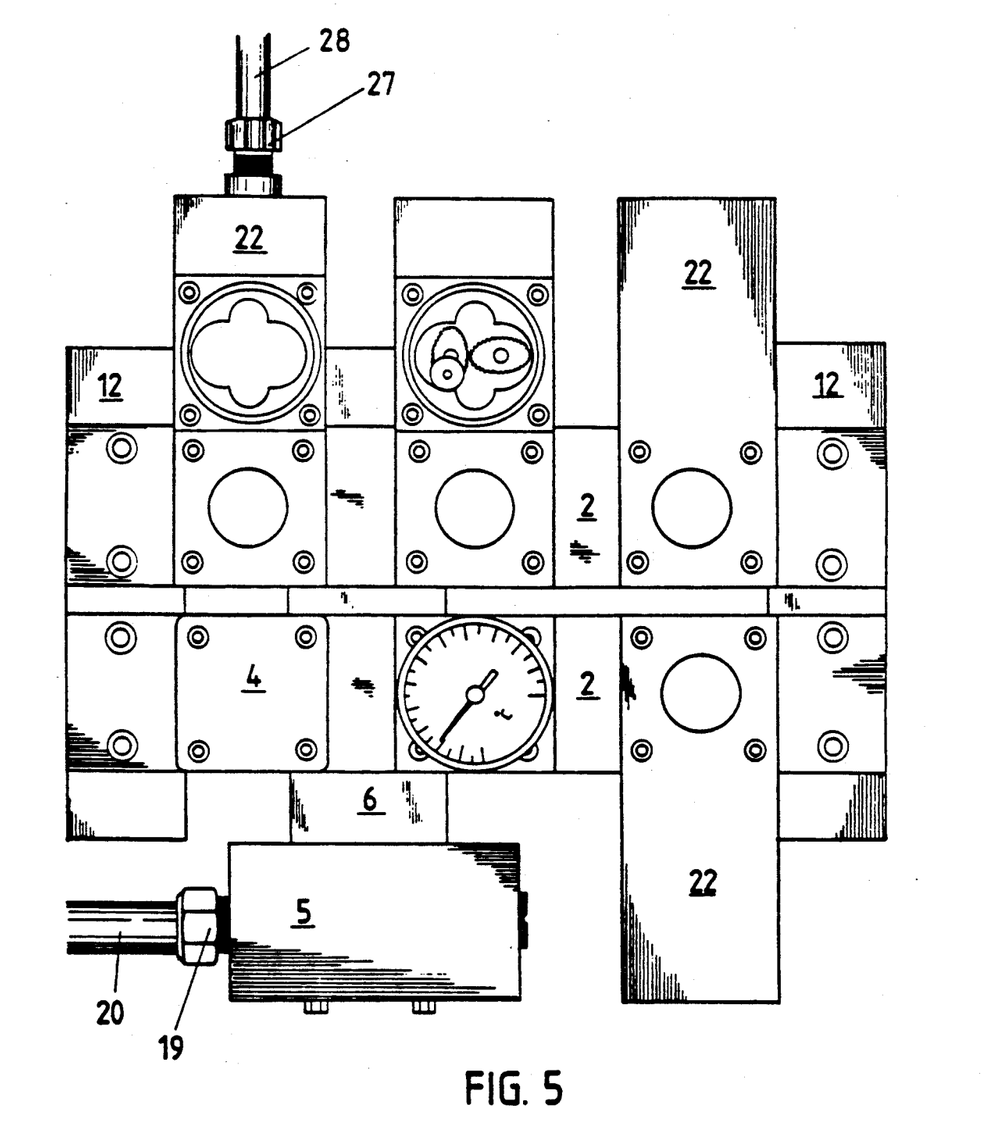
FIG. 5 is a plan view illustrating another lubricating oil distribution and measuring unit.

FIG. 5 shows another example of a completed unit. These two three-way distribution beams 2 are connected to a feed beam 6. This unit is supported by support beams 12 attached to the distribution beams 2. Of the six outputs, four are used for the distribution of lubricating oil and are equipped with flowmeters 22. One output has thermometer 26 and one, which remains in reserve, has a blind plate 4. Because a feed pipe 20 comes from the side, a one-way feed beam 5 is used, which is connected to the end of the proper distributing feed beam 6. It is also possible to reduce the bending of the outgoing pipes 28 if the meters 22 themselves have several alternative outputs.

Figure 6:
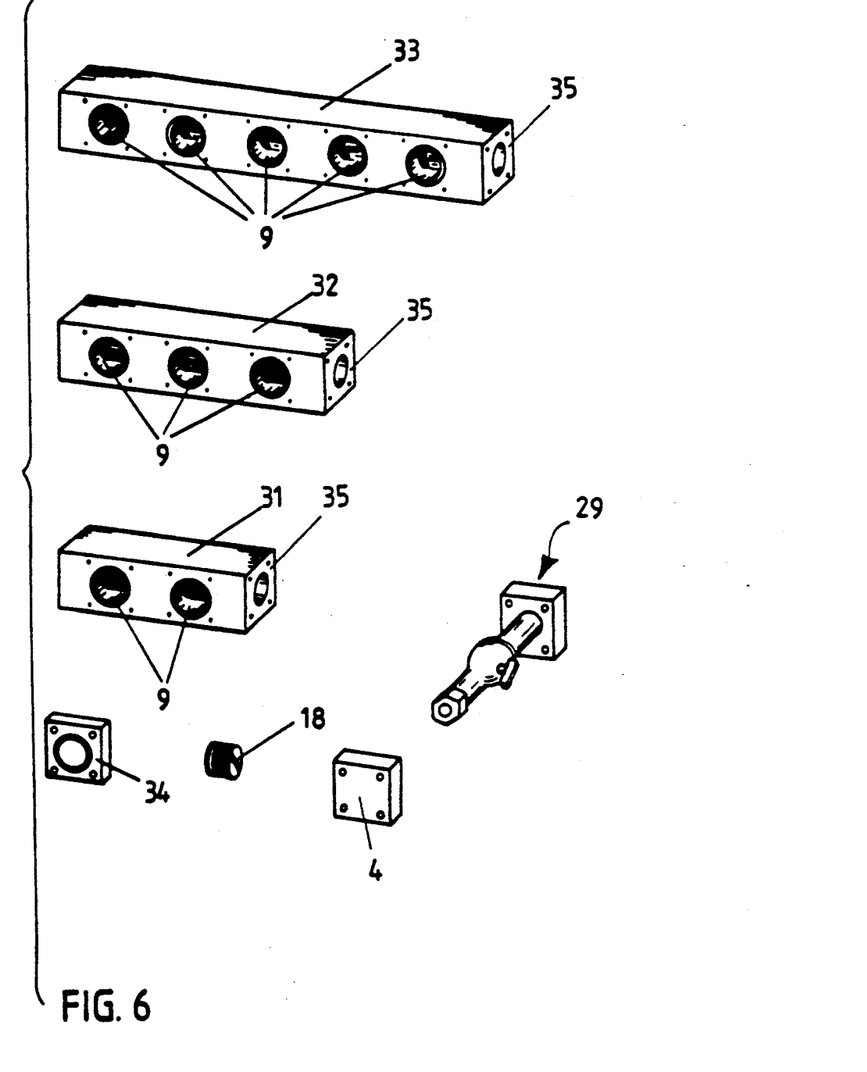
FIG. 6 is an exploded perspective view illustrating the components of another advantageous series.

FIG. 6 shows the distribution beams 31-34 of an alternative embodiment of the series that is a variation of the previous one. In this embodiment, the same feed beams as shown in FIG. 1 are used. However, the distribution beams differ from the previous example in that at their ends, separate and securing holes are no longer used. Instead, all attachment are carried out using the securing holes in the output connections 9 and the ends 35. End 35 is most advantageously closed by means of blind plate 34, in which a gasket construction has been formed. It is also possible to attach on the other side of blind plate 4 which forms a gasket surface.

In addition to the above-mentioned valve adaption, the series includes a simple valve module 29, in which an ordinary valve has been welded to the flange part. The flange is equipped with a gasket construction, if the valve is used on the feed side. Herein, the internal standardization has been altered in such a way that neither the input connections, nor the hole in the end 35 are equipped with prefabricated threads; because if required, this can be carried out in-situ. All the attachment holes of the output connections in the distribution beams 31-33 are spaced equally and run right through the beam, in which case they form threaded attachment holes for feed beams on the opposite side of the beam. The feed beam can be placed freely at any spacing whatsoever by merely boring holes in it. The gasket construction required is in the feed beam and the distribution beam has only a gasket surface.

If a large feed flow is required, it is possible to use two feed beams or to make a feed beam that differs from the dimensions of the distribution beam, in which the cross-sectional area of the channel has been increased.

While the best mode for carrying out the invention has been described in detail, those familiar with the art to which this invention relates will recognize various alternative designs and embodiments for practicing the invention as defined by the following claims.

What is claimed is:

1. An assembling series of distribution and measurement unit for a lubricating oil system for machinery consisting of several bearings, said series includes at least two distribution beams of different sizes, each beam being equipped with a longitudinal channel and input connections, which has two or more output connections located at right-angles to the channel for flowmeters and other components, and the purpose of said series is to achieve a lubricating oil distribution and measurement unit for various cases, characterized in that the longitudinal channels are otherwise unrestricted and the series includes at least two feed beams of different sizes, said feed beams being connected to said distribution beams and extending in a transverse direction in relation to said distribution beam to feed the distribution beams and which variously-sized distribution beams are equipped with a plurality of output connections, each defined by a opening in which each opening is surrounded by a gasket against which a gasket surface of the component to be connected is compressed, and said series includes a blind plate or other standard plug to close surplus output connections wherein said distribution and feed beams include attachment holes spaced in said beams, wherein the spacing of the output connections and the attachment holes is standard in most of the distribution beams of the series and that the input connection can be staggered between two output connections on the opposite side of the beam, wherein both the distribution and feed beams have a generally squared cross sectional shape defining a central passageway which forms the oil channel and an end hole of the beams of which are equipped with an input connection plug or feed pipe connector for installation and in both of which a similar output connection is used.

2. An assembling series of distribution and measurement unit for a lubricating oil system for machinery consisting of several bearings, said series includes at least two distribution beams of different sizes, each beam being equipped with a longitudinal channel and input connections, which has two or more output connections located at right-angles to the channel for flowmeters and other components, and the purpose of said series is to achieve a lubricating oil distribution and measurement unit for various cases, characterized in that the longitudinal channels are otherwise unrestricted and the series includes at least two feed beams of different sizes, said feed beams being connected to said distribution beams and extending in a transverse direction in relation to said distribution beam to feed the distribution beams and which variously-sized distribution beams are equipped with a plurality of output connections, each defined by a opening in which each opening is surrounded by a gasket against which a gasket surface of the component to be connected is compressed, and said series includes a blind plate or other standard plug to close surplus output connections, said beams including attachment holes spaced in said beams, wherein the spacing of the output connections and the attachment holes is standard in most of the distribution beams of the series and that the input connection can be staggered between two output connections on the opposite side of the beam, and wherein both the distribution and feed beams have a generally square cross sectional shape defining a central passageway which forms the oil channel and an end hole of the beams of which are equipped with an input connection plug or feed pipe connector for installation and in both of which a similar output connection is used, wherein the series includes distribution beams equipped with two, three, and five output connections, and feed beams equipped one, two, three and four output connections and an attachment beam equipped with selected hole spacing corresponding to the distribution of the output connections of the feed beams to which the distribution beams are adapted to be attached by their ends.

3. A series in accordance with claim 2 wherein all the output connections are symmetrical, thereby making it possible for the components to be attached to the distribution beams in at least two ways, i.e. in both directions at right-angles against the distribution beam and by means of a single output connection included in the series the feed beam can be attained in four different directions.

4. A series in accordance with claim 3 wherein the series includes a valve module defined by an ordinary valve attached to a blind plate part.

* * * * *

UNITED STATES PATENT AND TRADEMARK OFFICE
CERTIFICATE OF CORRECTION

PATENT NO. : 5,197,568

DATED : March 30, 1993

INVENTOR(S) : KALEVI V. HORTTONEN

It is certified that error appears in the above-identified patent and that said Letters Patent is hereby corrected as shown below:

Col. 2, line 11, after "measurement", delete "s" from "units".

Col. 3, line 30, after "of" insert -- an --.

Col. 3, line 34, delete "s" from "includes".

Col. 3, line 37, delete "s" from "includes".

Col. 3, line 39, delete "s" from "includes".

Col. 3, line 49, after "Figure", insert -- 1 --.

Col. 6, claim 1, line 41, after "connections", insert -- , --.

Col. 6, claim 1, line 47, after "beam", delete " . " and insert -- , --.

Signed and Sealed this

Thirtieth Day of November, 1993

Attest:

BRUCE LEHMAN

*Attesting Officer*

*Commissioner of Patents and Trademarks*